(12) United States Patent
Rako et al.

(10) Patent No.: US 12,742,863 B2
(45) Date of Patent: Sep. 22, 2026

(54) OPTICAL SWITCH FOR DYNAMIC RANGE LIDAR

(71) Applicant: Arete Associates, Northridge, CA (US)

(72) Inventors: Steven Eric Rako, Longmont, CO (US); James Thomas Murray, Longmont, CO (US)

(73) Assignee: Arete Associates, Northridge (CA)

( * ) Notice: Subject to any disclaimer, the term of this patent is extended or adjusted under 35 U.S.C. 154(b) by 972 days.

(21) Appl. No.: 18/000,757

(22) PCT Filed: Jan. 25, 2021

(86) PCT No.: PCT/US2021/014940
§ 371 (c)(1),
(2) Date: Dec. 5, 2022

(87) PCT Pub. No.: WO2021/151087
PCT Pub. Date: Jul. 29, 2021

(65) Prior Publication Data

US 2023/0258784 A1 Aug. 17, 2023

Related U.S. Application Data

(60) Provisional application No. 62/965,644, filed on Jan. 24, 2020.

(51) Int. Cl.

| | |
|---|---|
| ***G01S 7/486*** | (2020.01) |
| ***G01S 7/481*** | (2006.01) |
| ***G01S 7/484*** | (2006.01) |

(52) U.S. Cl.
CPC .......... *G01S 7/4868* (2013.01); *G01S 7/4818* (2013.01); *G01S 7/484* (2013.01)

(58) Field of Classification Search
None
See application file for complete search history.

(56) References Cited

U.S. PATENT DOCUMENTS 4,906,092 A * 3/1990 O'Meara ................ G01S 17/50 398/151
5,303,020 A * 4/1994 Croteau ................. G01S 7/489 359/257

* cited by examiner

*Primary Examiner* — Luke D Ratcliffe
(74) *Attorney, Agent, or Firm* — FisherBroyles, LLP; Gregory T. Fettig

(57) ABSTRACT

In one embodiment, a system includes a signal generator operable to generate a control waveform, an optical splitter operable to split light among first and second optical paths, and a detector in optical communication with the first optical path and operable to provide reference for the control waveform generation of the signal generator via the light of the first optical path. The system also includes an optical switch operable to attenuate a portion of the light of the second optical path based on the generated control waveform to detect a dynamic range signal.

17 Claims, 16 Drawing Sheets

In [+]= Plot[Cos[π*V/(2*Vπ)]^2/. {Vπ → 300}, {V, 0, 600}, Frame → True,
FrameLabel → {"Applied Voltage (V)", "Transmission",
"Vπ=300V SINGLE-Pass Input and Output Polarizers Parallel"}]

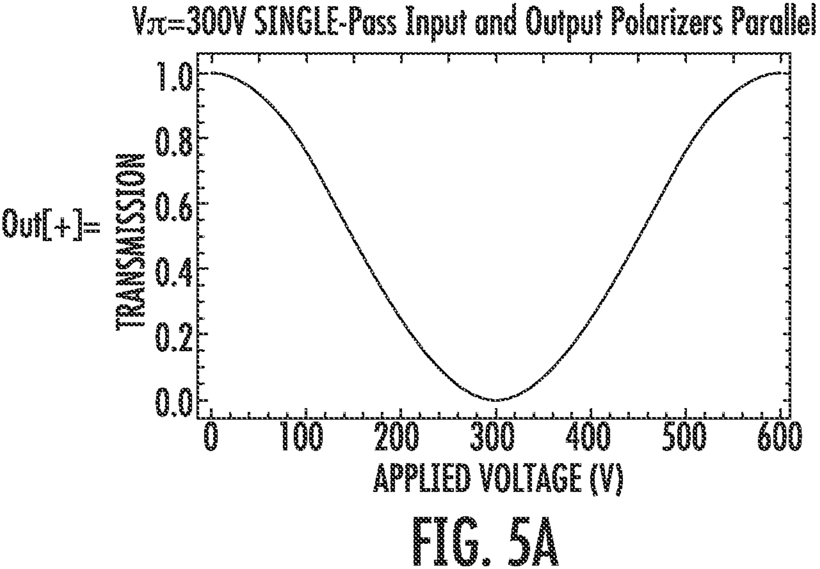

FIG. 5A

In [+]= Plot[Sin[π*V/(2*Vπ)]^2/. {Vπ → 300}, {V, 0, 600}, Frame → True,
FrameLabel → {"Applied Voltage (V)", "Transmission",
"Vπ=300V SINGLE-Pass Input and Output Polarizers Perpendicular"}]

Vπ=300V SINGLE-Pass Input and Output Polarizers Perpendicular

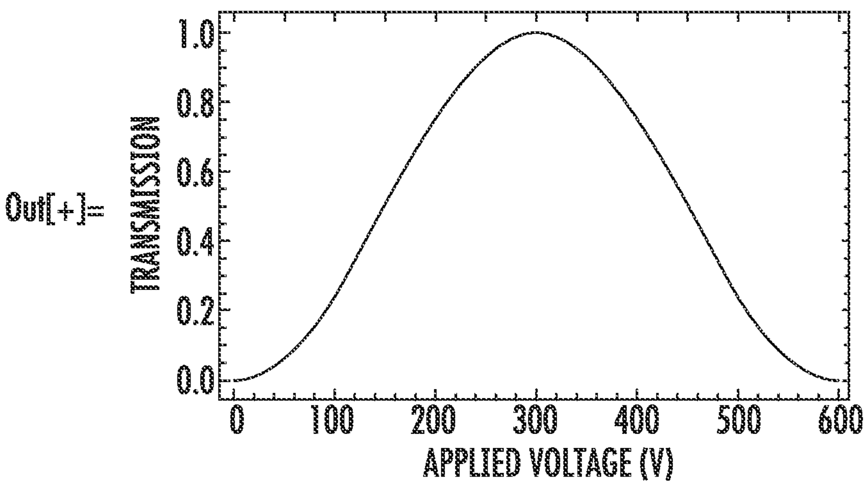

FIG. 5B

```
In [+]= Plot[Sin[π*V/(2*(Vπ/2))]^2/. {Vπ → 300}, {V, 0, 600}, Frame → True,
        FrameLabel → {"Applied Voltage (V)", "Transmission",
              "Vπ=300V DOUBLE-Pass with one Input/Output Polarizer"}]
```

Vπ=300V Double-Pass with one Input/Output Polarizer

Out[+]=

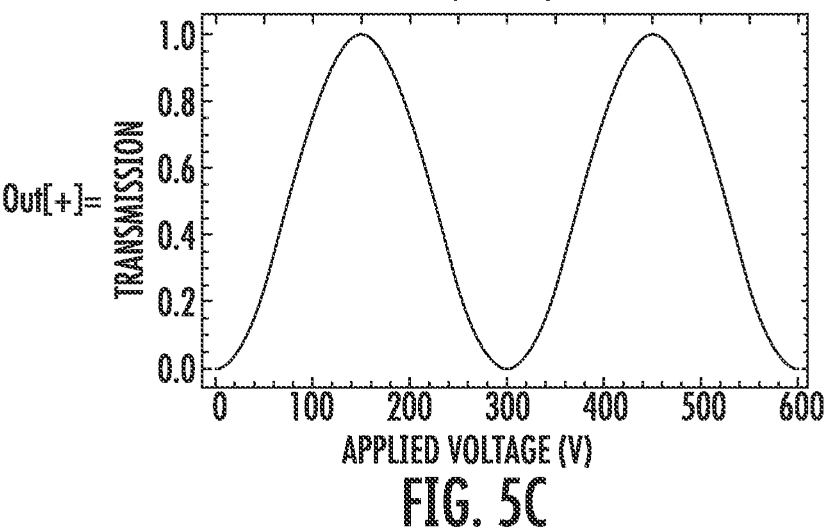

FIG. 5C

```
In [+]= Plot[Cos[π*V/(2*(Vπ/2))]^2/. {Vπ → 300}, {V, 0, 600}, Frame → True,
        FrameLabel → {"Applied Voltage (V)", "Transmission",
              "Vπ=300V DOUBLE-Pass with one Input/Output Polarizer and QWP"}]
```

Vπ=300V Double-Pass with one Input/Output Polarizer and QWP

Out[+]=

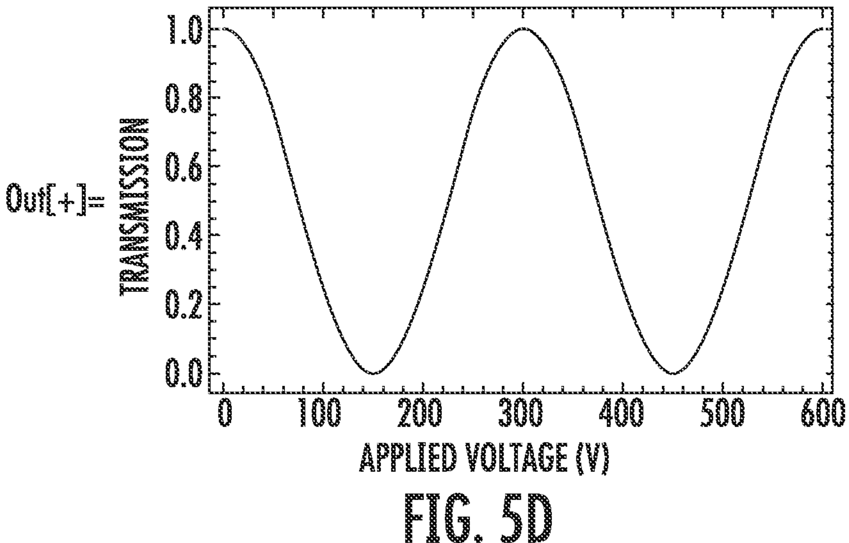

FIG. 5D

OPTICAL SWITCH FOR DYNAMIC RANGE LIDAR

CROSS REFERENCE TO RELATED APPLICATIONS

This application is a National Stage Application of PCT/US2021/014940, filed Jan. 25, 2021, which claims the benefit under 35 U.S.C. (e) to U.S. Provisional Patent Application No. 62/965,644 (filed Jan. 24, 2020), the contents of which are hereby incorporated by reference.

BACKGROUND

In lidar (light detection and ranging), lasers are used to propagate laser light to a target such that the range to a target can be determined. For example, a laser may fire a laser pulse at a target. Then, when light returning from the target is detected, the distance to the target can be calculated based on the round-trip time of the laser pulse and the speed of light (approximately $3\times10^8$ meters per second).

However, targets are generally not confined to a vacuum. Rather, they are located in environments with obscurants such as smoke, fog, etc. (e.g., distributed scatterers), as well as other targets. These obscurants and/or other targets also cause light to be returned to a receiver. And, when these obscurants and/or other targets are closer than the target of interest, they generally produce much stronger (e.g., more intense) returns than the returns from farther portions of the scene where the target of interest may be located.

Typically, returns from near objects or distributed media are larger (e.g., more intense) than returns from objects that are farther in range. And, the received power of the light diminishes by $1/R^2$ as the apparent size of receiver decreases with range, R, to a target. Additionally, a laser light's power decreases as it propagates through a volume of distributed scatterers, which reduces the backscattered signal return from the back of the volume. And, the return signal from the back of the volume still has to pass through the volume to the lidar receiver. Thus, a greater transmit (Tx) power is needed to see far and/or obscured objects. But, with sufficient power to observe distant targets, near range returns can cause a lidar detector to saturate so that measurements are degraded. Additionally, extreme saturation may cause sustained electrical ringing and noise in the receiver electronics which further degrades the measurements of farther targets that arrive later in time.

SUMMARY

Systems and methods presented herein provide for a receiver that dynamically attenuates laser light returns such that other laser light returns may be observed without saturation. In one embodiment, a light receiver (e.g., a lidar receiver) includes a signal generator operable to generate a control waveform (e.g., a radio frequency, or "RF", waveform). An optical splitter of the receiver may be operable to split received light among first and second optical paths, and a detector in optical communication with the first optical path may be operable to control the RF waveform generation of the signal generator based on the light of the first optical path. The system also includes an optical switch operable to attenuate a portion of the light of the second optical path based on the generated control waveform.

In one embodiment, the optical switch is a Fast Optical Switch (FOS) that facilitates optical dynamic-range enhancement. In some embodiments, the FOS operates as a Fast Variable Optical Attenuator (FVOA) that attenuates near range returns via a known time varying transmission gating function. For example, the FOS may apply an RF voltage (e.g., the generated RF waveform) to produce a commensurate optical attenuation in a received signal. Then, a processor may reconstruct a full optical signal by dividing the received waveform by the transmission gating function.

The various embodiments disclosed herein may be implemented in a variety of ways as a matter of design choice. For example, some embodiments herein are implemented in hardware, whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

FIG. 5 illustrates various exemplary waveforms that may be generated by the receiver of FIG. 4 to dynamically attenuate received light.

DETAILED DESCRIPTION OF THE FIGURES

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Figure 1:
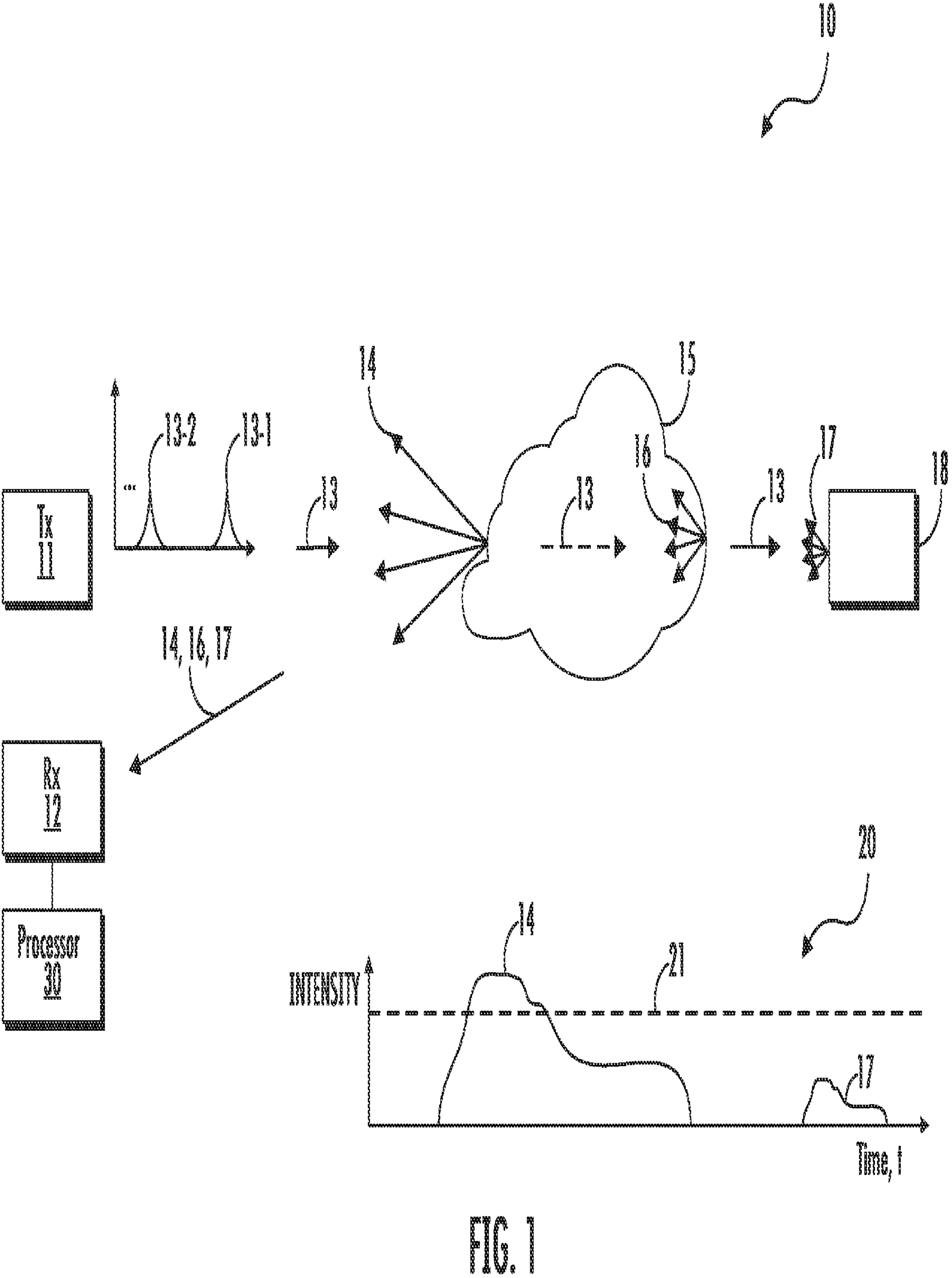
FIG. 1 is a block diagram of an exemplary system operable to attenuate returns of near range light.

Turning now to FIG. 1, a block diagram of an exemplary lidar system 10 is illustrated. In this embodiment, the lidar system 10 includes a transmitter 11 and a receiver 12. The transmitter 11 is operable to fire one or more laser pulses 13 to determine a range of a target 18. As is often the case, obscurants may lie between the lidar system 10 and the target 18 being interrogated. For example, a volume of distributed scatterers 15 may exist in the form of smoke, moisture, dust, etc. Thus, when the transmitter 11 fires the laser pulses 13 at the target 18, the distributed scatterers 15 may provide lidar returns 14 where the laser pulses 13 initially strike the distributed scatterers 15. Some of the light from the laser pulses 13 may pass through the volume of distributed scatterers 15 and provide returns 16 from the back of the volume as well as from everywhere within the volume. And, some of the light from the laser pulses 13 may pass through the volume of distributed scatterers 15 and scatter from the desired target 18 to provide the returns 17.

The distributed scatterers 15 also tend to attenuate the lidar returns as illustrated with the diminishing size arrows 14, 16, and 17. Thus, near range lidar returns, such as the lidar returns 14 and 16, have much greater intensity than the lidar returns 17 from the target 18 (e.g., far range returns). These near range lidar returns may saturate a detector located with the receiver 12 and make observations of the farther range lidar returns (e.g., the lidar returns 17) difficult if not impossible to detect. For example, if the receiver gain or transmission is reduced to avoid saturation of the brighter returns (typically in the nearer ranges), the lowered gain or transmission would also make weaker returns (possible from further objects) so weak to prohibit detection.

The graph 20 illustrates an intensity versus time plot of lidar returns 14 and 17 being received by the receiver 12. The lidar returns 14 being closer to the receiver are received before the lidar returns 17 and with greater intensity. The intensity level 21 may represent an intensity level at which the detector saturates (e.g., the point at which the output of the photodetector becomes nonlinear). Generally, absolute measurements are not possible with a sensor if intensities exceed saturation. And, for relatively high intensities, receiver electronics may have ringing and/or noise effects that degrade subsequent measurements, making the farther range lidar returns 17 undetectable.

The receiver 12, in this embodiment, is operable to attenuate the near range lidar returns 14 and 16 such that both the near range and the far range lidar returns 17 can be observed by the detector. More specifically, the receiver 12 is operable to dynamically attenuate any undesirable light (e.g., to prevent saturation of a detector) such that data loss due to saturation, "ringing", and the like does not occur. For example, the receiver 12 may generate an RF waveform that operates a known gating function to control an FOS within the receiver 12. In this regard, the FOS may produce a commensurate optical attenuation in the received signal. Then a processor 30 may reconstruct a full optical signal by dividing the received waveform by a time varying transmission gating function of the FOS such that the lidar returns, near range and/or far range, can be observed.

In some embodiments, the receiver 12, may also be operable to attenuate bright returns in the far range, avoiding saturation and permitting absolute measurement. Regardless of the ranges of the brightest returns, the receiver 12 may act to avoid saturation of the received waveform. In any case, the receiver 12 is any device, system, software, or combination thereof operable to dynamically attenuate portions of received laser light.

Figure 2:
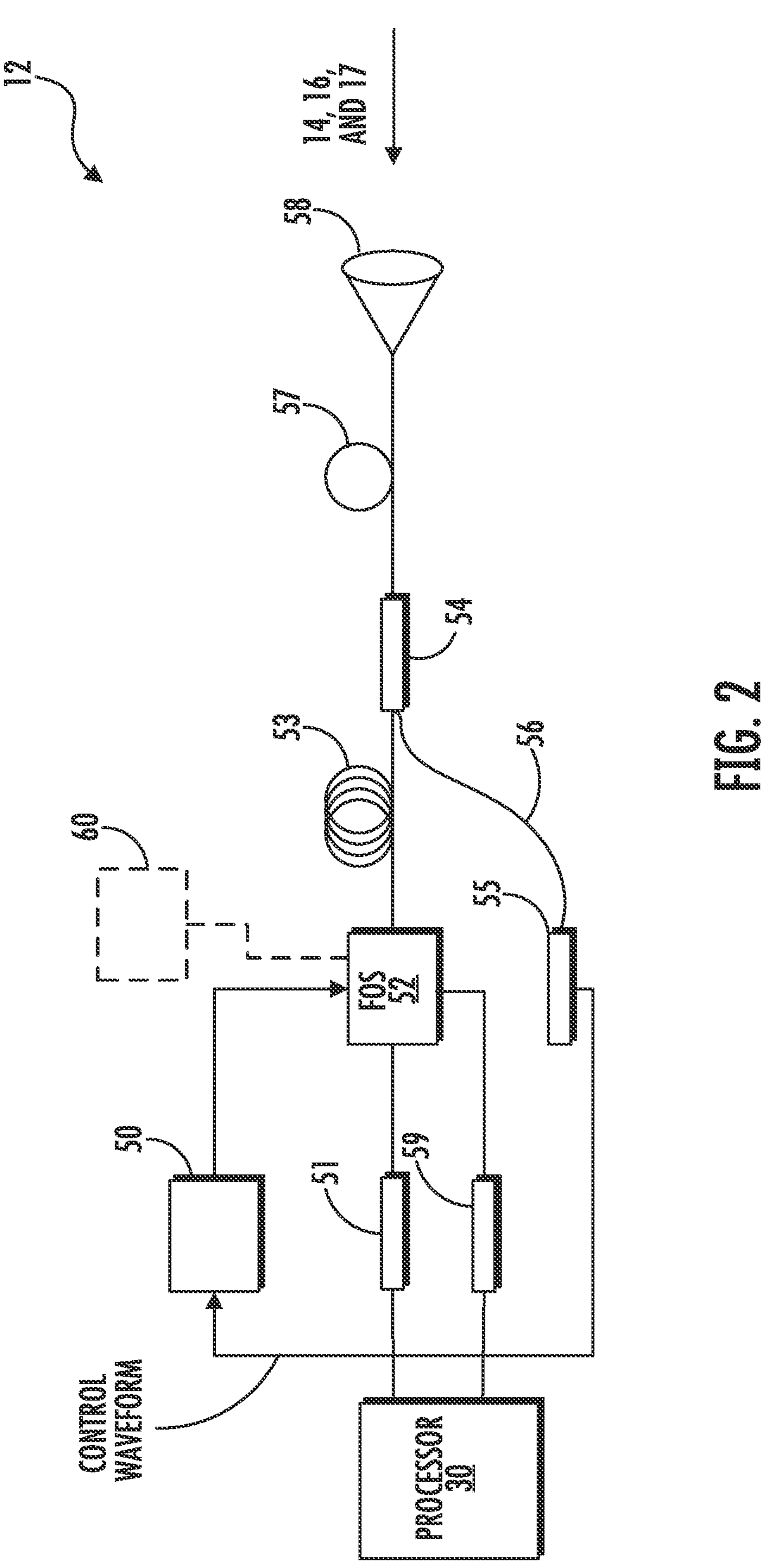
FIG. 2 is a block diagram of an exemplary receiver of FIG. 1 employing an FOS.

FIG. 2 is a block diagram of an exemplary receiver 12 employing an FOS 52. In this embodiment, the receiver 12 is configured with an optical element 58 (e.g., a lens, an aperture, a combination thereof, etc.) that receives lidar returns 14, 16, and 17 scattered from various ranges. The optical element 58 may propagate the lidar returns along a fiber 57. In some embodiments fiber 57 is a multimode fiber. The lidar returns 14, 16, and 17 may then be split along first and second optical paths 56 and 53 by an optical splitter 54. For example, the optical splitter 54 may split a portion of the light of the lidar returns 14, 16, and 17 (e.g., about 90% or more) along the optical path 53 configured from a multimode fiber. The optical splitter 54 may split the remaining portion of the light to a detector 55 along the optical path 56.

The detector 55 may include a plurality of detector elements that are operable to convert light into a signal that is representative of the light. This signal may be used as a control waveform for an input to a signal generator 50. The signal generator 50 may, in turn, output an RF electrical waveform that is used to control an FOS 52. For example, the light of the lidar returns 14, 16, and 17 may propagate along a longer optical path 53 that introduces a delay in the lidar returns 14, 16, and 17 to the FOS 52 so that waveform generator 50 has time to prepare an appropriate attenuation signal that is matched to the lidar returns.

In some embodiments, the FOS 52 may include an electro-optic modulator that uses a double-pass configuration such that the transmitted signal is a sinusoidal function of the RF electrical waveform. For example, a quarter wave voltage (QWV) can be achieved by applying a static voltage of about 150V. When the RF electrical waveform is varied continuously between 0V and QWV, it can produce an attenuation that varies continuously between maximum attenuation and minimum attenuation, respectively. Alternatively, the introduction of a quarter wave plate (QWP) in such a double-pass configuration may also allow the attenuation to vary continuously between minimum attenuation and maximum attenuation (e.g., when the RF electrical waveform is varied continuously between 0V and QWV, respectively).

Generally, when the RF electrical waveform is applied, the FOS attenuation is approximately proportional to RF electrical waveform. More specifically, the attenuation function to the FOS 52 is related to the RF waveform. In the simplest case, the attenuation function is proportional to the RF waveform. However, the attenuation function may be nonlinear (e.g., $\sin^2$) or may depend on a transfer function. In some embodiments, a contrast from the FOS of about 15:1 is achievable. The RF electrical waveform may direct the FOS 52 to attenuate the closer range lidar returns 14 and 16 such that the farther range lidar returns 17 may be detected by an optical detector 51.

From there, the processor 30 may reconstruct a full optical signal by dividing the received waveform by the time varying transmission gating function of the FOS 52, which is a function of the RF electrical waveform. In some embodiments, the light attenuated from the FOS 52 is available through a separate output (e.g., another detector 59) that may be used to measure the attenuated light and calibrate the receiver 12. In such an embodiment, the light that is attenuated prior to detection by the detector 51 may additionally or alternatively be rerouted and detected by the detector 59. The detector 59 may be configured to have a lower gain than the detector 51 so that it is not saturated by near range signals. The ratio of signals from the detector 51 to the sum of the gain adjusted signals from both the detector 51 and the detector 59 may then be used as a measurement of the applied attenuation from the FOS 52. Alternatively, the sum of the gain adjusted signals may be used as a measurement of the lidar returns instead of either detector alone.

In some embodiments, the gating function may be determined by directly measuring the transmission gating function of the FOS 52 via a known calibrated optical source 60 (optional) as an input. For embodiments where the FOS 52 is bi-directional, this measurement can be made at or about the same time the transmission gating function is being applied to the lidar returns 14, 16 and 17, for example, by propagating the known calibrated source 60 in the opposite direction as the lidar returns through the FOS 52, combining forward propagating light and/or separate reverse propagating light, and measuring the amount of transmitted light from the calibrated source 60 on another detector 59. The time varying transmission gating function can then be determined by dividing the signal power determined from the detector 59 by the known (e.g., calibrated) power input to the FOS 52 via the calibration source 60.

In some embodiments, the receiver 12 may record the measured lidar waveforms to calculate and generate an RF electrical waveform for use on lidar returns from subsequent laser pulses. For example, if a lidar system is transmitting pulses through a cloud of distributed scatterers 15, it may be expected that subsequent laser pulses will lead to returns having features similar to past laser pulses. And, RF waveforms providing time-dependent attenuation by the FOS 52 based on previous measured lidar returns may be sufficient to avoid signal saturation. Such embodiments do not necessarily require the detector 55 or the detector 59 as the RF waveform may be generated by the processor 30.

Figure 3:
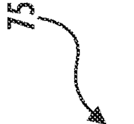
FIG. 3 is a graph illustrating an exemplary signal return improvement via the FOS.

FIG. 3 is a graph 75 illustrating detector amplitude versus time (in nanoseconds) of an exemplary signal return improvement via the FOS 52. For example, the lidar system 10 may fire the laser pulses 13 through a cloud of distributed scatterers 15 (e.g., a dust cloud) to the target 18. The FOS 52 may effectively attenuate laser backscatter from the distributed scatterers 15 and other near range returns (e.g., amplitudes 76 and 78 on the graph 75 corresponding to the lidar returns 14 and 16). In this example, the lidar system 10 is shown to detect laser backscatter from a target 18 placed at 40 ft (e.g., amplitude 81 of the laser returns 17). As can be seen in the graph 75, the FOS 52 attenuates the lidar returns 14, 16, and 17 according to the transmission curve 80. Thus, the lidar returns 14 and 16 are attenuated to the amplitudes 77 and 79, thereby increasing detection capabilities of the lidar returns 17 of the target 18 corresponding to the amplitude 81. Thus, even greater amplitude lidar returns that may saturate the detector 51 could be attenuated to allow the detector 51 to observe the lidar returns 17 of the target.

In some embodiments, the FOS 52 can demonstrate a maximum contrast ratio of 5:1 and a switching time from 5× to 1× attenuation in about 100 ns. In some embodiments, based on laboratory measurements, the contrast of the FOS 52 may reach maximum contrast ratio of about 15:1 with additional alignment optimization. An additional improvement may be realized by using a more optimal linear amplifier and/or a high voltage driver (e.g., the signal generator 50). An example of one driver includes a piezo driver capable of a fixed 50:1 voltage gain (150V max), a max slew rate of 2 kV/μs, and a bandwidth of 2.6 MHz. A driver capable of 200V may allow the FOS 52 to achieve maximum extinction of the near range lidar returns. It should be understood by one skilled in the art that any number of devices and optical effects may be used to implement FOS 52. For example, the FOS 52 may be coupled via fiber or free space optics and may be implemented through the electro-optic effect in an interferometric configuration, the Pockels effect with polarization optics, dynamic beam steering, beam focusing mechanisms with a fixed aperture, and/or other methods to produce variable attenuation.

Figure 4:
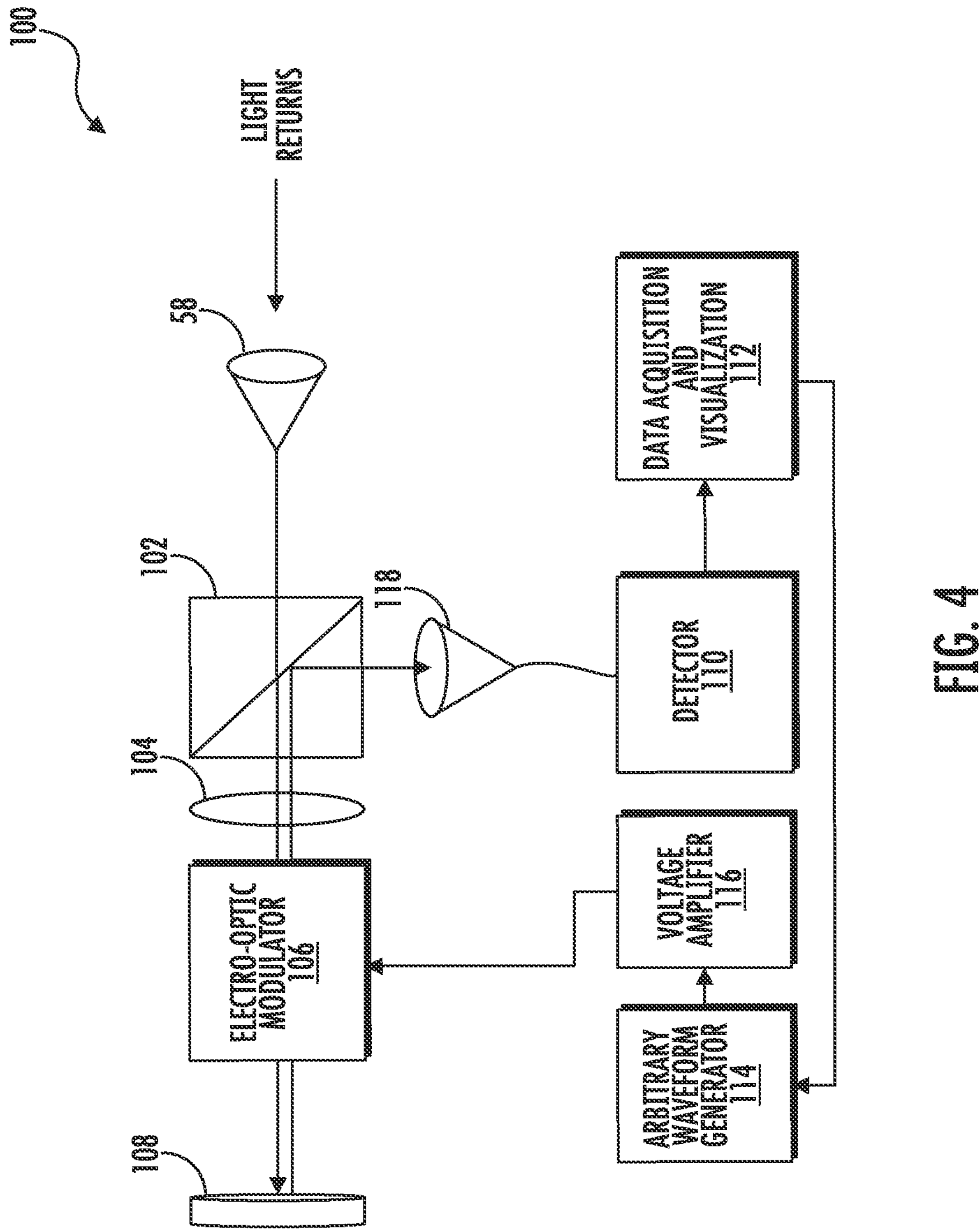
FIG. 4 is a block diagram of an exemplary receiver employing a Pockels cell to dynamically attenuate received light.

FIG. 4 is a block diagram of an exemplary receiver 100 employing a Pockels cell as an FOS. In this embodiment, the receiver 100 is operable to receive light returns (e.g., lidar returns 14, 16, and 17 of FIG. 1) through the optical element 58, which propagates the light to a polarization beam splitter 102. The polarization beam splitter 102 allows the light to propagate through a quarter wave plate 104 and to an electro-optic modulator 106, which modulates the optical phase of the received light. The modulated light is reflected off a mirror 108 back to the polarization beam splitter 102 where it is reflected to an optical element 118 for propagation to a detector 110. From there, various signals can be detected via the data acquisition and visualization module 112.

This acquired signal is also used by an arbitrary waveform generator 114 to generate a control signal which controls the electro-optic modulator 106. For example, based on the received light, a control signal may be generated by the arbitrary waveform generator 114 to dynamically attenuate certain portions of the received light, as shown and described herein. A voltage amplifier 116 may also be used to increase a gain of the control signal to the electro-optic modulator 106. This configuration may provide a transmission gating function that varies compared to a static applied voltage. For electro-optic materials used in Pockels cells that have strong piezo electric effect (e.g., $KD_2PO_4$, or DKDP, and its isomorphs), there may be a time-dependent effect that is important to consider in controlling the device. But, several common materials, including BBO (i.e., Beta Barium Borate) and RTP (i.e., Rubidium Titanyl Phosphate) have piezo effects that may be of little importance when designing an FOS, such the FOS 52.

FIGS. 5A-5D illustrate various exemplary waveforms that may be generated to dynamically control the attenuation of light received by receiver 100. $V_\pi$ may be defined as the voltage at which a phase change of 7C (e.g., equivalent to a half an optical wavelength) is induced between polarization components in the Pockels cell. These waveforms illustrate sine or cost type functions that provide the amount of transmission versus applied voltage to a Pockels device. For example, in FIG. 5A, in a double pass configuration, half of the voltage is used to achieve full contrast when compared to single-pass configuration. Here, the range of 0V-QWV quarter wave voltage is used to achieve a full range of operation, compared to the situation where 0V-HWV half-wave-voltage would be required in a single-pass configuration (e.g., QWV=HWV/2). Additionally, by changing the orientation of an output polarizer, by introducing a HWP half wave plate (both being relevant for single pass—FIGS. 5A and 5B), or by introducing a QWP quarter wave plate (being relevant for double-pass—FIGS. 5C and 5D), the choice can be made by whether 0V applied represents a minimum or maximum FOS transmission. And, for particularly high bandwidth or where piezo effects are important, there may be a time-dependent transfer function that is also be considered.

In some embodiments, the FOS of this Pockels cell embodiment may include a fiber-coupled electro-optic modulator that produces attenuation that is independent of a polarization state. In some instances, this might be achieved by coupling the orthogonal polarization separated by an input polarizer into a different or same Pockels device and recombining transmitted polarization components at the analyzer polarizer. In other embodiments, the FOS may include a high electro-optic coefficient material, such as PLZT (Lanthanum-Modified Lead Zirconate Titanate), PMN-PT (Pb(Mg1/3Nb2/3Nb2/3)O3-xPbTiO3), and/or other optical components coupled to a 62 μm core graded index multi-mode fiber to achieve a half wave voltage (HWV) of approximately 186V, and a switching speed of less than 50 nanoseconds with a maximum contrast of approximately 22 dB.

Figure 6:
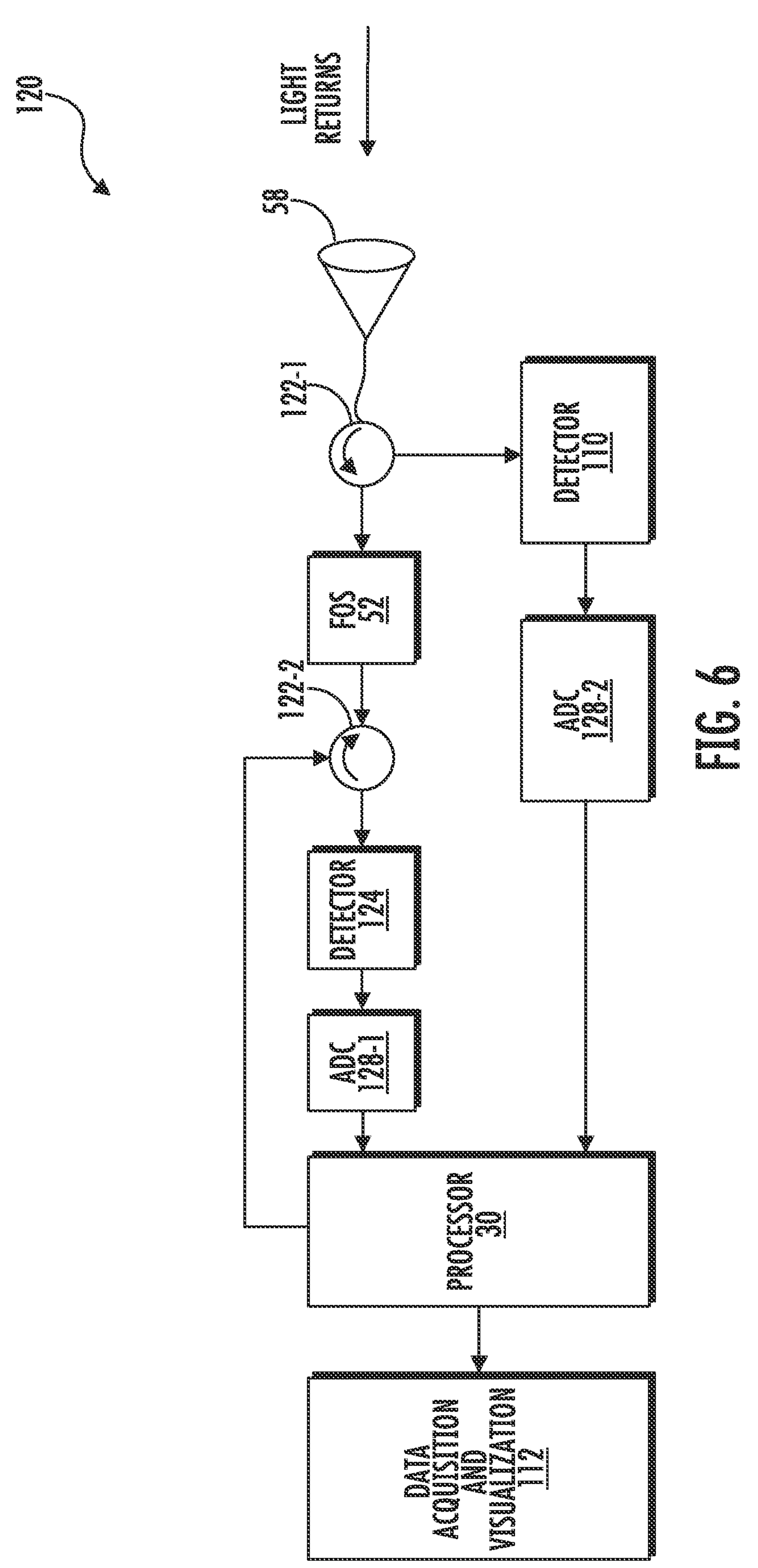
FIG. 6 is a block diagram of an exemplary receiver using optical circulators in conjunction with an FOS to dynamically attenuate received light.

FIG. 6 is a block diagram of an exemplary receiver 120 using optical circulators 122 in conjunction with the FOS 52 to dynamically attenuate received light. In this embodiment, light is received via the optical element 58 and propagated to a first optical circulator 122-1. In this regard, light collected by the optical element 58 enters the circulator 122-1 and passes through to the FOS 52, and then through the circulator 122-2 to the detector 124. A calibration source (e.g., from the processor 30) is coupled into circulator 122-2 and reverse propagated through the FOS 52 and then through circulator 122-1 to be measured on the detector 110. In this way, the "forward propagating" light of the "optical signal" is isolated from "backward propagating" light of the calibration source such that a measurement of the FOS attenuation function can be derived independent of a received signal. The light propagated to the detector 110 may be used to generate the control waveform in that it assists the transfer function that relates the control signal to the time varying transmission function of the FOS 52.

The receiver may also include an analog to digital converter (ADC) 128-2 that digitizes the signal from the detector 110 and transfers it to the processor 30. The processor 30 may generate a control waveform used to dynamically attenuate portions of the received light based on the digitized light of the ADC 128-2. In this regard, the FOS 52 may delay the portion of the received light from the optical circulator 122-1 and propagate it to the optical circulator 122-1 which subtracts the control waveform of the processor 30 from the received light, thereby attenuating any undesirable portions of the received light. Then, the light may be detected by the detector 124 and converted into electronic form via the ADC 128-1 for processing (e.g., via the data acquisition and visualization module 112).

Figure 7:
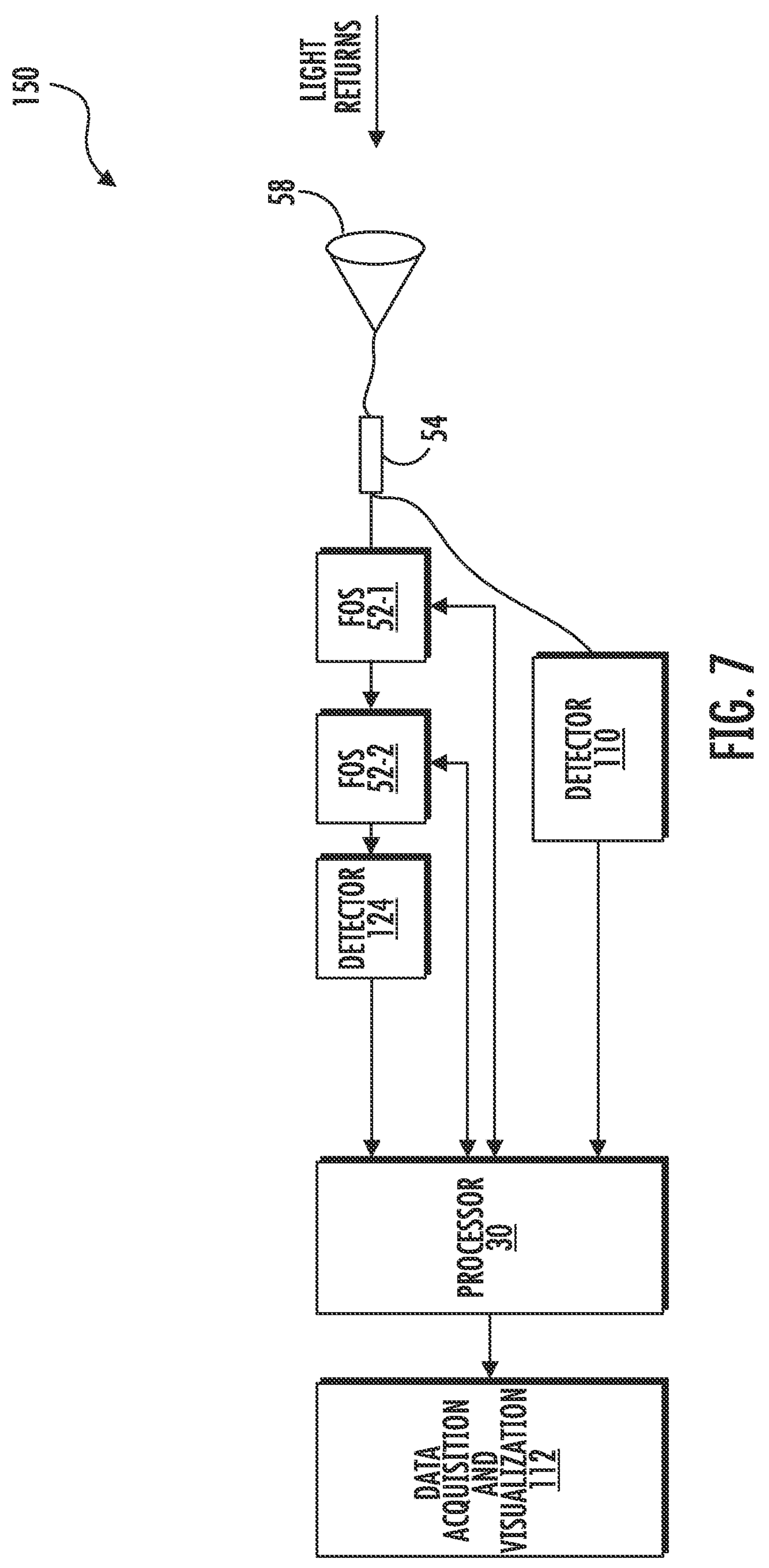
FIG. 7 is a block diagram of an exemplary receiver using multiple FOSs to dynamically attenuate received light.

FIG. 7 is a block diagram of an exemplary receiver 150 using multiple FOSs 52 to attenuate received light. In this embodiment, the FOSs 52-1 and 52-2 may be used in series for dynamic range enhancement. For example, the optical element 58 may receive light and the optical splitter 54 may split that light along multiple paths (e.g., one to the detector 110 for the processor 30 to generate the transmission gating function and the other to the FOS 52-1). The dynamic range of a detector 124 may be the ratio of a maximum linear optical signal power (e.g., unsaturated) to a minimum detectable power, often defined by the noise equivalent power (NEP) in Watts. And, the dynamic range of the FOS 52-1 may be defined as the ratio of maximum transmission of the device in its highly-transmissive state (e.g., often defined as the insertion loss) to the minimum transmission of the FOS 52-1 in its highly-attenuating state (e.g., often defined as the extinction or contrast). The dynamic range of the FOS 52-1 and the detector 124 together is approximately the product of the dynamic range of the FOS 52-1 and the dynamic range of the detector 124. By incorporating additional FOS devices, such as FOS 52-2, the optical dynamic range may be further enhanced by the product of the dynamic range of the additional FOS 52-2. For example if the dynamic range of the detector 124 equals 100, the dynamic range of the FOS 52-1 equals 10, and the dynamic range of the FOS 52-2 equals 2, then the dynamic range of the receiver 150 equals 100×10×2, or 2000.

Figure 8:
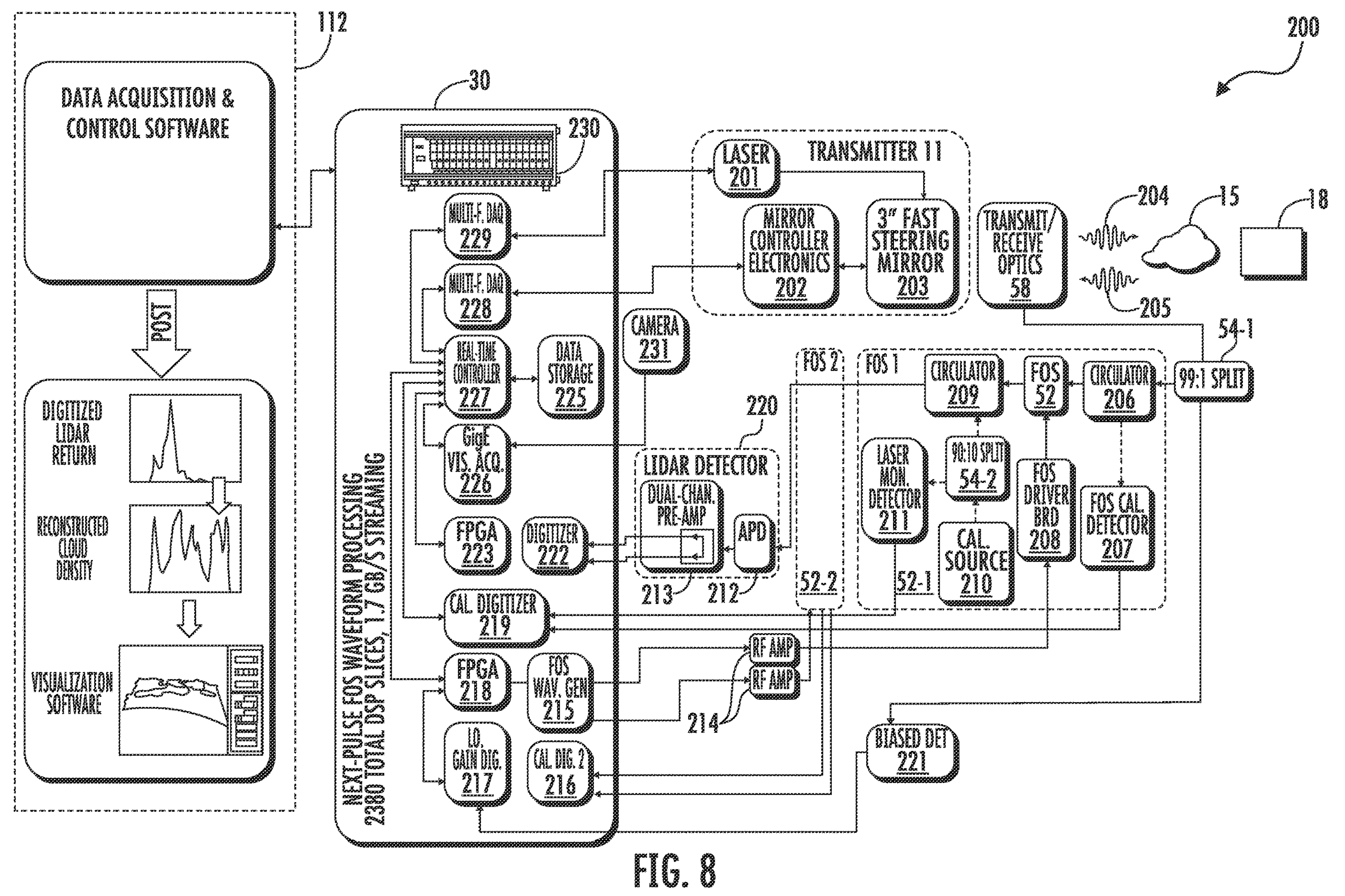
FIG. 8 is a block diagram of an exemplary light transmitter/receiver employing multiple FOSs.

FIG. 8 is a block diagram of an exemplary light transmitter/receiver 200 employing multiple FOSs 52 (e.g., FOSs 52-1 and 52-2). In this embodiment, the processor 30 is configured with a variety of components including a PXI express chassis 230, multifrequency data acquisition modules 228 and 229, a real-time controller 227, a data storage module 225, a GigE vision acquisition module 226, field programmable gate arrays (FPGAs) 223 and 218, a digitizer 222, calibration digitizers 219 and 216, an FOS waveform generation module 215, and a local oscillation gain digitizer 217.

The transmitter 11 is a laser transmitter that includes a laser 201 that may be controlled by the multifrequency digital acquisition module 229. The transmitter 11 may also include mirror control electronics 202 that are controlled by the multifrequency digital acquisition module 228 that directs a steering mirror 203 to transmit laser light 204 (e.g., lidar pulses) from the laser 201 through the transmit/receive optics 58 to a target 18 (e.g., through a cloud of distributed scatterers 15). The laser returns 205 may be received by the transmit/receive optics 58 where they are split via the optical splitter 54-1. One portion of the laser returns 205 (e.g., about 99% of the light) propagates to the FOS through an optical circulator 206, and then through another optical circulator 209 to another FOS 52-2 (e.g., as with the embodiment illustrated in FIG. 7). For the purpose of simplicity, the FOS 52-2 is shown as a single element. However, the FOS 52-2 may be configured in the same or similar fashion as the FOS 52-1. The FOS 52-2 propagates the laser returns 205 to a lidar detector 220. The lidar detector 220 includes an avalanche photodiode 212 and a dual channel preamplifier 213 through which the laser returns 205 are detected and amplified for processing by the digitizer 222 of the processor 30.

The other portion of the laser returns 205 split by the optical splitter 54-1 are propagated to a bias detector 221 to assist in the transmission gating function waveform generation. This portion of the laser returns 205 may be digitized by the local oscillation gain digitizer 217 and processed by the FPGA 218. This processing may direct the FOS waveform generation module 215 to generate the transmission gating function that directs the FOS 52-1 and the FOS 52-2 to dynamically attenuate certain portions of the laser returns 205. The signals may be amplified by the RF amplifier modules 214 and then sent to FOSs 52-1 and 52-2 to control the FOSs 52.

A calibration source module 210 may provide the transmission gating function to the optical circulator 209 (e.g., from the processor 30) which back propagates through the FOS 52-1 to the optical circulator 206. And, an FOS calibration detector 207 may receive this signal to assist in the calibration of the calibration source 210. In this regard, the signal may be digitized by the calibration digitizer 219 for subsequent use by the calibration source 210. Additionally, the signal from the calibration source 210 may be split by another optical splitter 54-2 where the signal may be detected by an optical detector 211 and converted into an electronic signal that may be digitized by the calibration digitizer 219 to assist in the calibration of the FOS 52-1. The same or similar functionality may be performed in the FOS 52-2. Once the dynamic attenuation is performed, the processor 30 may transfer the data to the data acquisition and visualization module 112 for observance. In some embodiments, the transmitter/receiver 200 may also include a camera 231 to provide real-time visualization of the scene being interrogated with the transmitted laser light 204, where it may be processed by a GigE visual acquisition module 226 for other control and/or visualization features.

Figure 9:
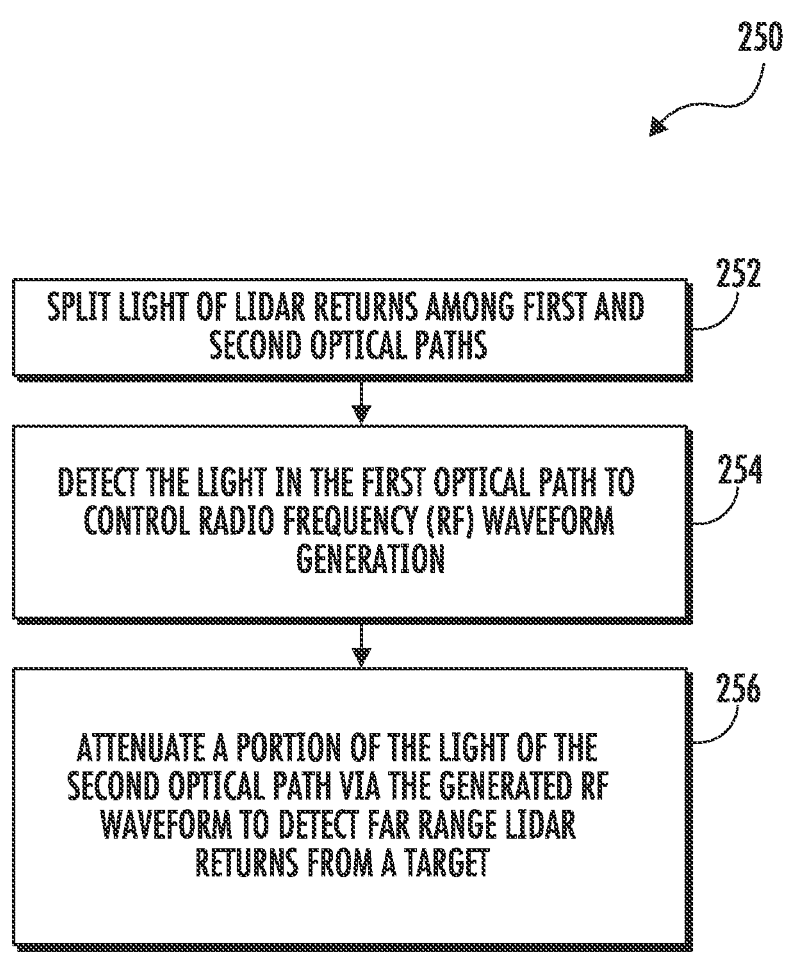
FIG. 9 is a flowchart of an exemplary process of the receiver of FIG. 2.

FIG. 9 is a flowchart of an exemplary process 250 of any of the receiver embodiments disclosed herein, such as the receiver 12 of FIG. 2. In this embodiment, lidar returns are received by the receiver of a lidar system (e.g., via the optical element 58), which are then split among first and second optical paths, in the process element 252. For example, the optical splitter 54 may split the lidar returns along the optical paths 53 and 56 in the receiver 12. A detectors, such as the detector 55 of FIG. 2, may detect the lidar returns in the optical path 56 to control RF waveform generation, in the process element 254. Then, based on the generated RF waveform, the FOS 52 may attenuate a portion of light of the optical path 53 (e.g., the portion of light associated with the lidar returns 14 and 16) so as to detect farther range and/or less intense lidar returns from the target 18 (e.g., lidar returns 17), in the process element 256. For example, the generated RF waveform, may operate as a known transmission gating function that controls the FOS 52 to produce a commensurate optical attenuation in the received signal. Then, a processor may reconstruct a full optical signal by dividing the received waveform by the gating function.

FIGS. 10A-10D are graphs illustrating exemplary dynamic attenuation adjustment of a light receiver, such as the receiver 12 of FIG. 2. For example, these graphs show various ways the "switching time" of a basic transmission gating function would affect return signals in comparison to received (e.g., saturated) signals without an FOS. In environments with considerable obscurants, lidar systems are often hampered by close range backscatter which can saturate the detection system causing loss of data and/or detector damage. This problem can be avoided by applying an appropriate gating function to the return signal such that high-intensity close-range backscatter is attenuated without compromising the detectability of farther range targets. One challenge in designing such a system is simultaneously achieving high speed and high contrast. Some operations may call for ranges between about 50 and 500 ft, corresponding to pulse time of flights (TOFs) of between about 100 ns and 1 μs. In one embodiment, switching time may be about 100 ns with a contrast of about 10:1.

Figures 10A, 10B, 10C, 10D:
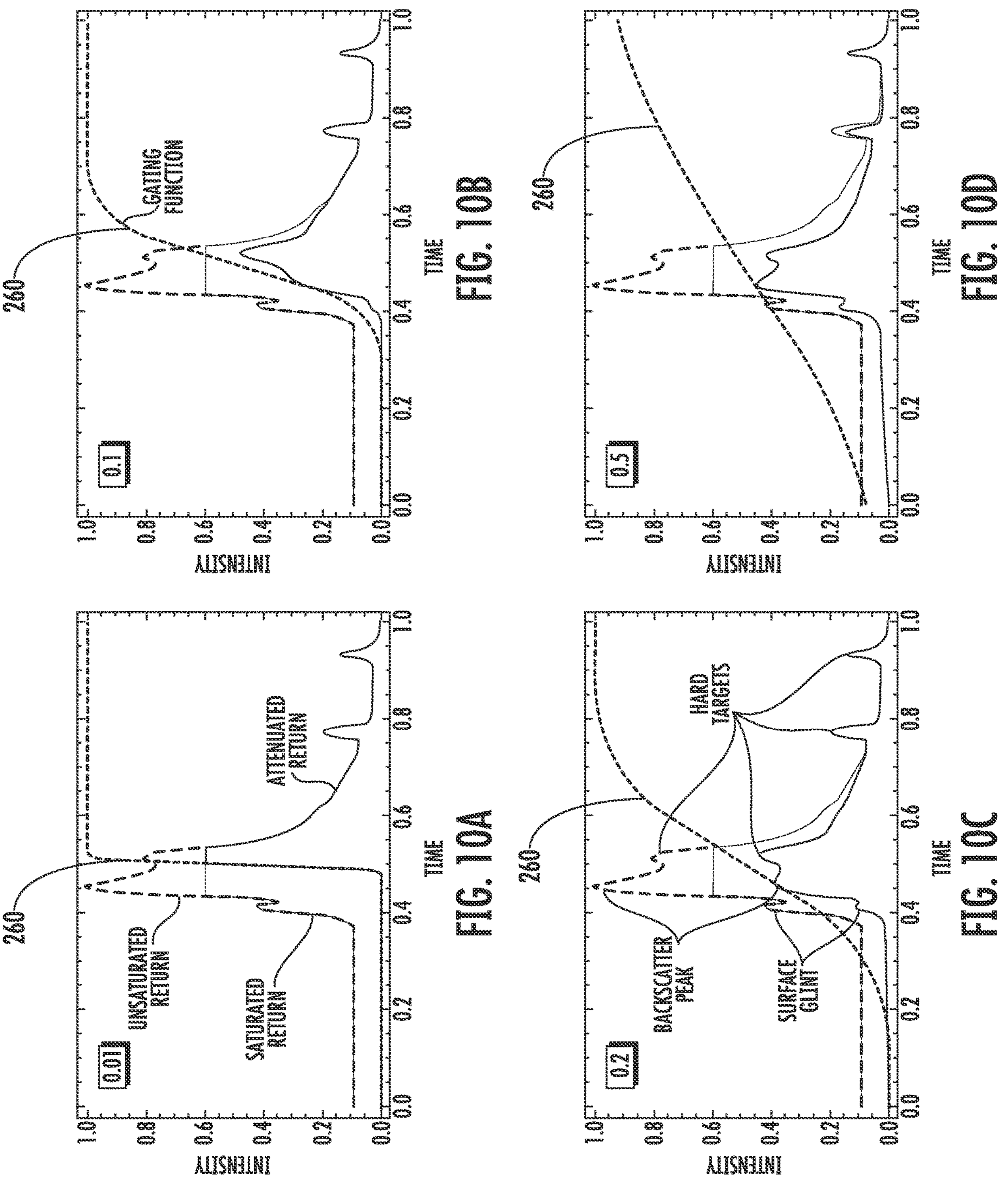
FIGS. 10A-10D are graphs illustrating exemplary dynamic gating function adjustment of the receiver of FIG. 2.

The gating function 260 generated based on the received light along the optical path (e.g., the optical path 56 of FIG. 2) may also be dynamically changed. For example, FIG. 10A illustrates a gating function which is almost a step function. This embodiment severely attenuates the near range returns (e.g., earlier received returns). And, as can be seen in FIGS. 10B through 10D, the gating function 260 is gradually changed such that near range returns are less attenuated, making them more observable without attenuating the far range returns.

Figure 11A:
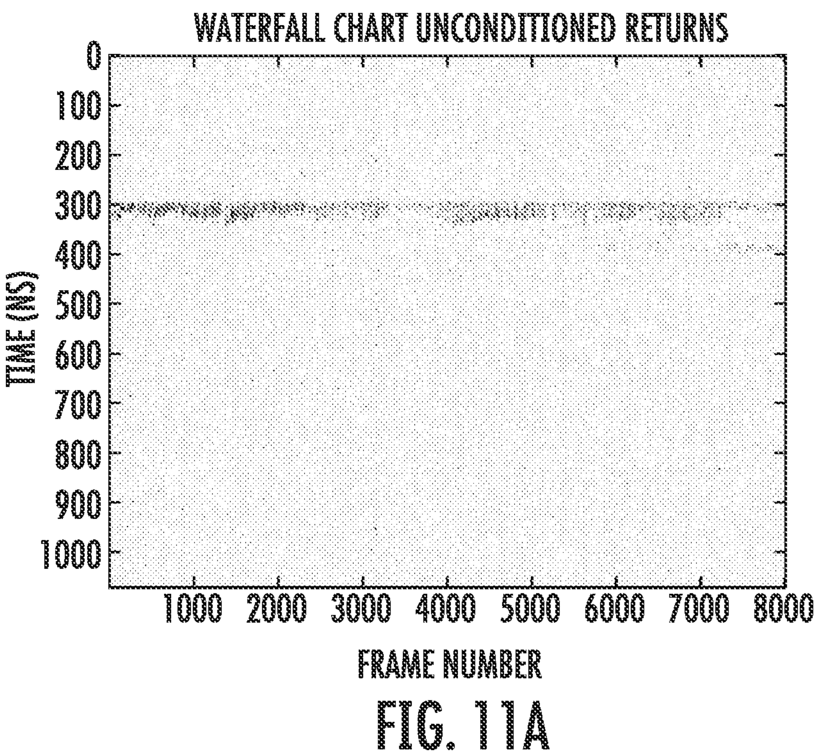
FIGS. 11A and 11B are exemplary "waterfall" captures of lidar returns.
Figure 11B:
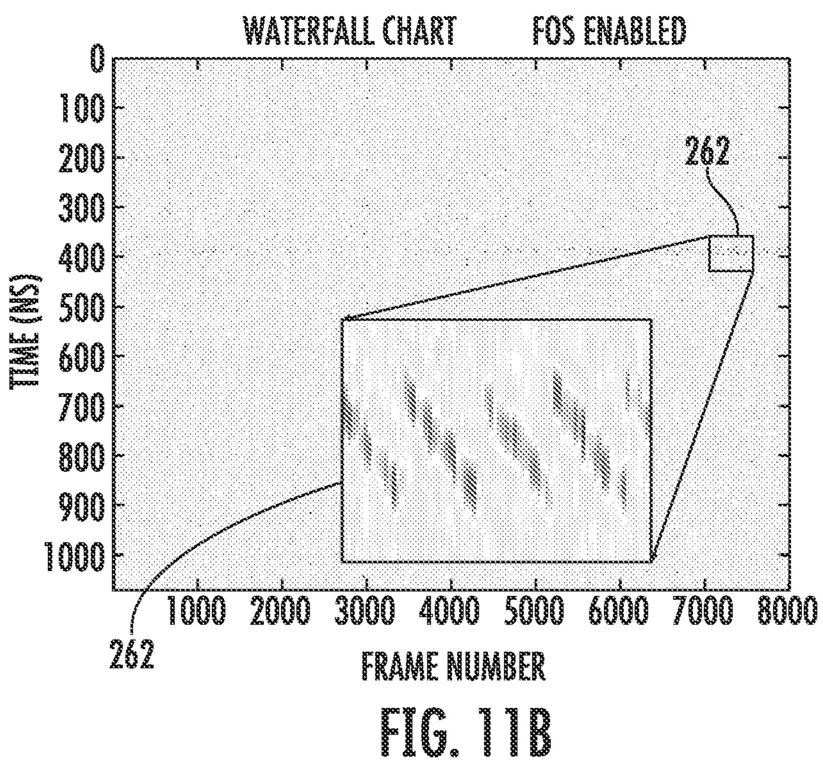

FIGS. 11A and 11B are exemplary "waterfall" captures of lidar returns obtained via a receiver (e.g., the receiver 12 of FIG. 2). In these captures, each frame represents a digitized recorded waveform from an optical detector (e.g., the optical detector 55 of FIG. 2). In this embodiment, the detected light is sampled at two giga samples per second and each frame begins about 300 ns before the laser pulses are generated. FIG. 11A illustrates "unconditioned" lidar returns that would be detectable without the use of the FOS 52. As can be seen, the near range returns (around 300 ns) make the far range returns (around 400 ns) nearly invisible since the near range returns are significantly more intense than the far range returns. FIG. 11B illustrates lidar returns that are processed via the receiver. As can be seen, the near range returns are nearly attenuated to the point of extinction. However, the far range returns (illustrated in exploded view 262 at around 400 ns) are now more detectable since the near range returns have been attenuated. It should be noted though that the attenuation of light can be dynamically changed so as to attenuate light from near range, far range, or anywhere in between, such that light from any desired range can be detected.

Figure 12A:
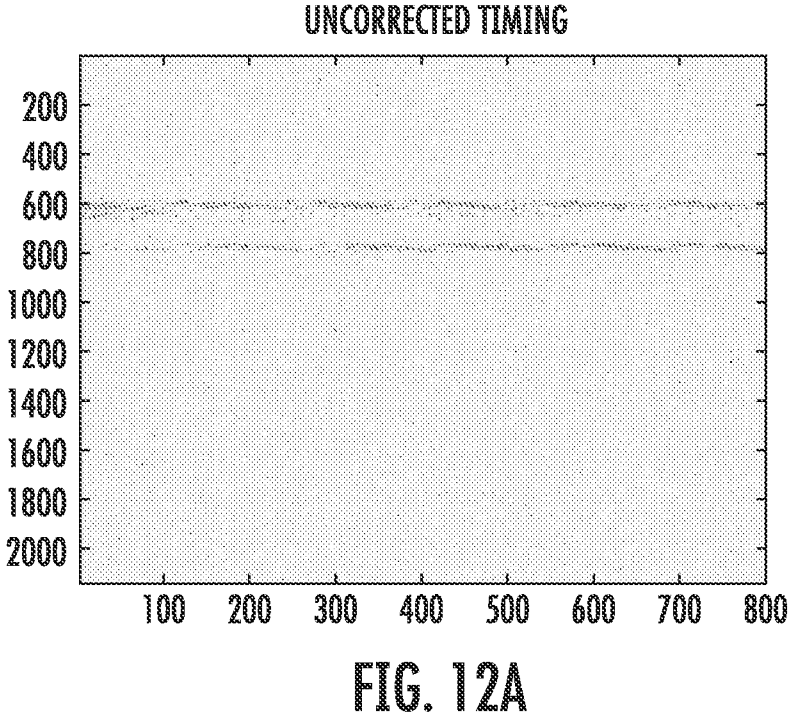
FIGS. 12A-12D are additional exemplary waterfall captures of lidar returns.
Figure 12B:
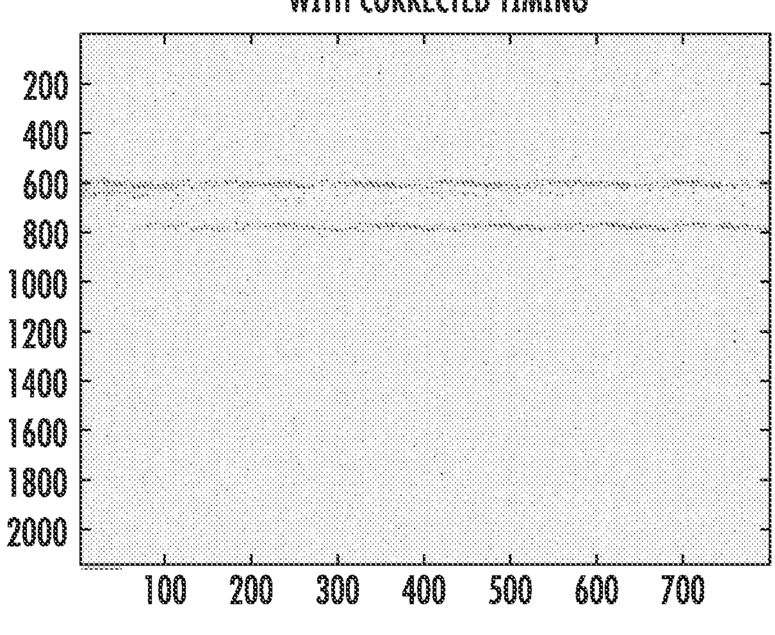
Figure 12C:
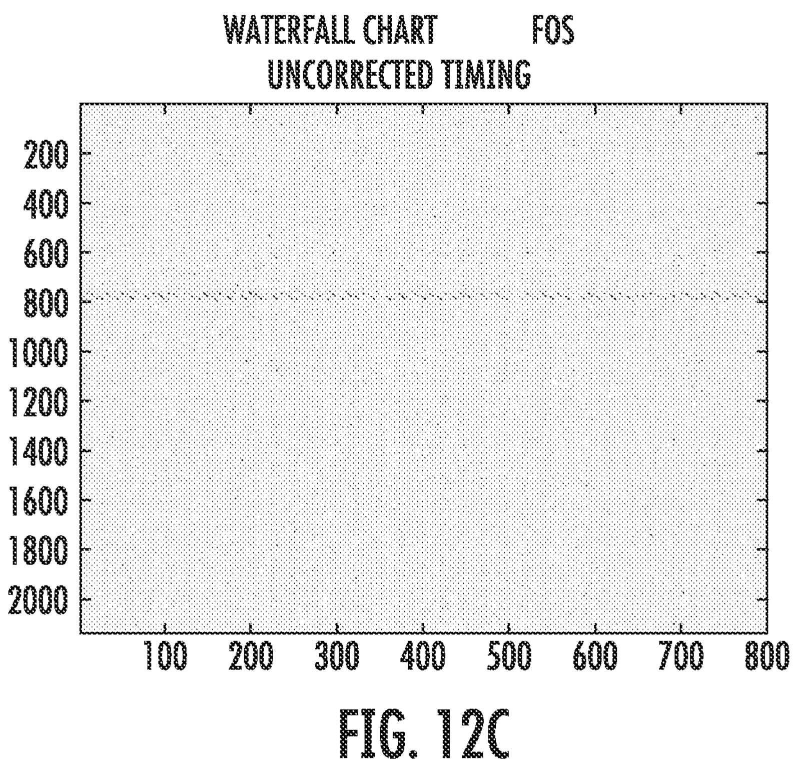
Figure 12D:
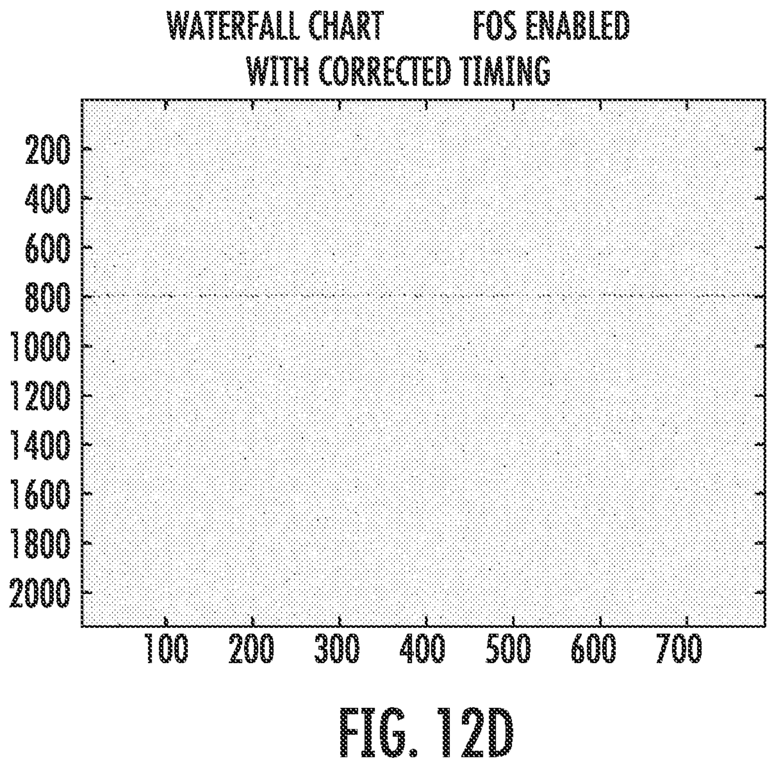

Synchronization of the delay between a frame start and a laser pulse can provide relative and/or absolute temporal alignment of frames for deriving or comparing ranges of objects in a scene, as can be seen in FIGS. 12A-12D. In FIGS. 12A and 12B, the waterfall captures illustrate the synchronized timing such that both of the near range returns (around 600 ns) and the far range returns (around 800 ns) are more detectable. And, FIGS. 12C and 12D show the attenuation of the near range returns such that virtually only the far range returns are detectable after synchronization.

In some embodiments, the time base of multiple captured frames (e.g., where a frame corresponds to a full-waveform capture of a return of a single pulse) may possess relative or absolute errors with respect to the actual round-trip time-of-flight of the laser pulse. In FIGS. 12A and 12B, both relative and absolute errors in synchronization are shown. One way such synchronization errors may be fixed is by using returns from a feature in the scene that has a known range (e.g., via an output window), and using this feature to rescale the time base such that this feature is shown in the scene at the known time-of-flight from the object.

Backscatter from the output window may provide both absolute and relative time synchronization as, in many cases, this represents t=0. If a known feature is not available, the system may incorporate a "light out" detector specifically to measure the moment at which a laser pulse is emitted from a point within the transmitter. Using special detectors or known references in the scene may be useful in correcting jitter (e.g., temporal variation in the time between a trigger signal being generated and the laser pulse being emitted) in the laser transmitter. For instances where synchronization errors are periodic in nature, where timing jitter is not significant, and/or where there is a known and fixed delay between the start of capture of the digitized lidar return and the emission of the transmitter pulse, the absolute and relative timing correction can be made by a relatively simple arithmetic corrections to the time base.

Figure 13A:
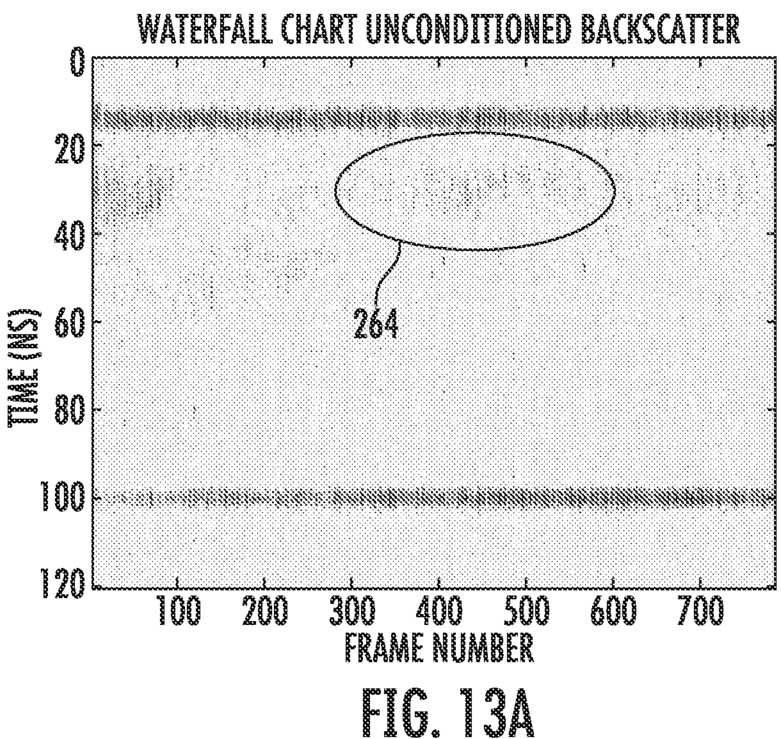
FIGS. 13A and 13B are also exemplary waterfall captures of lidar returns.
Figure 13B:
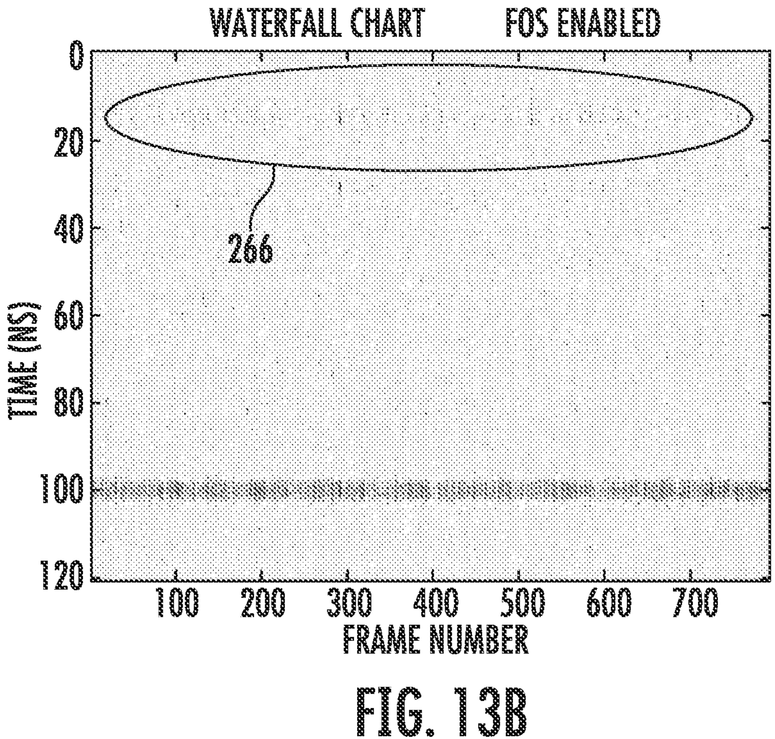

FIGS. 13A and 13B illustrate exemplary differences between unconditioned lidar returns (i.e., FIG. 13A) and the lidar returns processed by a receiver, such as the receiver 12 (i.e., FIG. 13B). In FIG. 13A, lidar returns (circled portion 264) that are backscattered from dust (e.g., the volume of distributed scatterers 15 of FIG. 1) as well as the near range lidar returns (e.g., around 15 ns) are detectable. However, in FIG. 13B, the near range returns and the dust backscatter are essentially extinguished (circled portion 266), leaving only the observable far range returns from the target (e.g., around 100 ns).

Although many of the embodiments herein are shown and described with respect to lidar returns, the embodiments are not intended to be so limited. Rather, the receiver embodiments herein may be used where the attenuation of brighter light is desired such that any light over a relatively large dynamic range may be observed.

Figure 14:
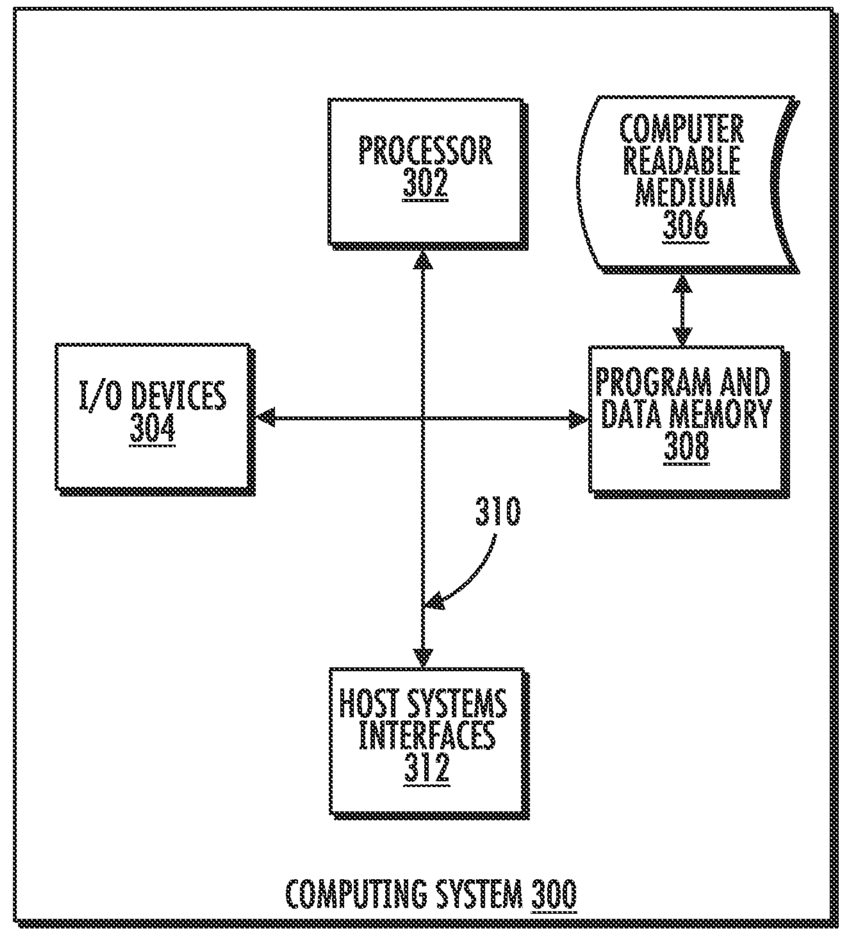
FIG. 14 is a block diagram of an exemplary computing system in which a computer readable medium provides instructions for performing methods herein.

The embodiments herein may be combined and/or operated in a variety of ways as a matter of design choice. For example, the FOS 52 may be electrically controlled, optically controlled, manually controlled, etc. And, the processors and signal generators shown and described herein may include digital circuitry, analog circuitry, or a combination thereof. Accordingly, the features and aspects herein are not intended to be limited to any particular embodiment. Furthermore, the embodiments can take the form of hardware, firmware, software, and combinations thereof. For example, optical components such as lenses are generally preconfigured "hard" components. However, other optical devices, including lenses may be electronically controlled. In this regard, certain embodiments herein may employ various combinations of hardware and software. In one embodiment, such software includes but is not limited to firmware, resident software, microcode, etc. FIG. 14 illustrates a computing system 300 in which a computer readable medium 306 may provide instructions for performing any of the methods and processes disclosed herein.

Furthermore, some aspects of the embodiments herein can take the form of a computer program product accessible from the computer readable medium 306 to provide program code for use by or in connection with a computer or any instruction execution system. For the purposes of this description, the computer readable medium 306 can be any apparatus that can tangibly store the program code for use by or in connection with the instruction execution system, apparatus, or device, including the computing system 300.

The computer readable medium 306 can be any tangible electronic, magnetic, optical, electromagnetic, infrared, or semiconductor system (or apparatus or device). Some examples of a computer readable medium 306 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 300 can include one or more processors 302 coupled directly or indirectly to memory 308 through a system bus 310. The memory 308 can include local memory employed during actual execution of the program code, bulk storage, and/or cache memories, which provide temporary storage of at least some of the program code in order to reduce the number of times the code is retrieved from bulk storage during execution. In some embodiments, the processor 302 may be a digital processor, however the processor may also include analog circuitry for rapid waveform generation and feedback.

Input/output (I/O) devices 304 (including but not limited to keyboards, displays, pointing devices, I/O interfaces, etc.) can be coupled to the computing system 300 either directly or through intervening I/O controllers. Network adapters may also be coupled to the computing system 300 to enable the computing system 300 to couple to other data processing systems, such as through host systems interfaces 312, printers, and/or or storage devices through intervening private or public networks. Modems, cable modems, and Ethernet cards are just a examples of network adapter types.

What is claimed is:

1. A system, comprising:
a signal generator operable to generate a control waveform;
an optical splitter operable to split light among first and second optical paths;
a detector in optical communication with the first optical path and operable to provide reference for the control waveform generation of the signal generator via the light of the first optical path; and
an optical switch operable to attenuate a portion of the light of the second optical path based on the generated control waveform to detect a dynamic range signal,
wherein the dynamic range signal comprises light detection and ranging (lidar) returns, the lidar returns comprise laser pulses, and a measurement of a one of the laser pulses is used in attenuating the portion of the light of the second optical path for the one laser pulse or another of the laser pulses.

2. The system of claim 1, further comprising:
a processor operable to process the light of the second optical path by dividing a measurement of the attenuated portion of the light of the second optical path by an amount of attenuation that is applied.

3. The system of claim 1, wherein:
the attenuated portion of the light comprises near range lidar returns.

4. The system of claim 3, wherein:
the near range lidar returns are at least partially attributable to a volume of distributed scatterers.

5. The system of claim 1, wherein:
the dynamic range signal comprises far range lidar returns.

6. The system of claim 1, further comprising:
an optical fiber operable to introduce a delay in the light of the second optical path.

7. The system of claim 1, further comprising:
another optical switch operable to increase a dynamic range of the system.

8. The system of claim 1, further comprising:
a multi-mode fiber in optical communication with the optical splitter to propagate the light to the optical splitter.

9. The system of claim 1, wherein:
the control waveform is a radio frequency waveform.

10. A method, comprising:
splitting light from lidar returns among first and second optical paths;
detecting the light in the first optical path to generate a radio frequency (RF) waveform; and
attenuating, with an optical switch, a portion of the light of the second optical path associated with near range lidar returns via the generated RF waveform to detect far range lidar returns from a target,
wherein the lidar returns comprise laser pulses, and the method further comprises using a measurement of one of the laser pulses in attenuating the portion of the light of the second optical path for the one laser pulse or another of the laser pulses.

11. The method of claim 10, further comprising:
processing the light of the second optical path by dividing a measurement of the attenuated portion of the light of the second optical path by an amount of attenuation that is applied.

12. The method of claim 10, further comprising:
introducing a delay in the light of the second optical path via an optical fiber.

13. The method of claim 10, further comprising:
increasing a dynamic range of the system with another optical switch.

14. The method of claim 13, further comprising:
propagating the light to an optical splitter via a multimode fiber.

15. A non-transitory computer readable medium comprising instructions that, when executed by a processor, direct the processor to attenuate light associated with near range lidar returns via:

a split of light from lidar returns among first and second optical paths;

a generation of a radio frequency (RF) waveform based on a detection of the light in the first optical path; and use of the generated RF waveform to attenuate a portion of the light of the second optical path associated with the near range lidar returns to detect far range lidar returns from a target, wherein the lidar returns comprise laser pulses, and the instructions further direct the processor to use using a measurement of one of the laser pulses to attenuate the portion of the light of the second optical path for the one laser pulse or another of the laser pulses.

16. The computer readable medium of claim 15, further comprising instructions that direct the processor to:

process the light of the second optical path by dividing a measurement of the attenuated portion of the light of the second optical path by an amount of attenuation that is applied.

17. The computer readable medium of claim 15, further comprising instructions that direct the processor to:

increase a dynamic range of the system via control of another optical switch.

* * * * *